United States Patent Office 3,458,218
Patented July 29, 1969

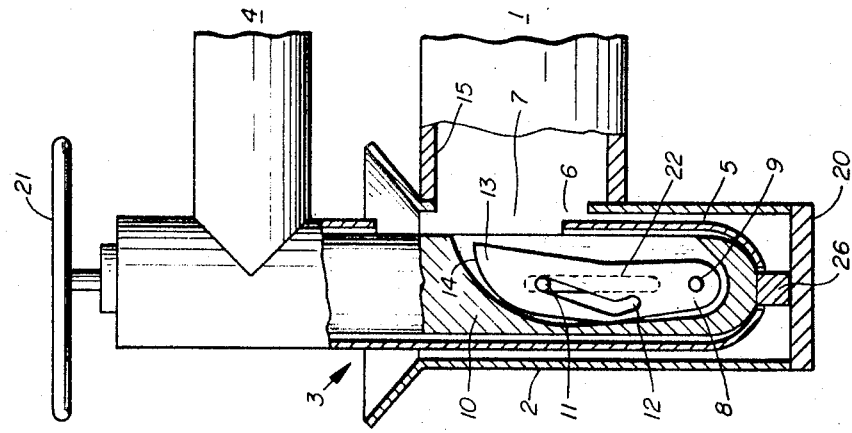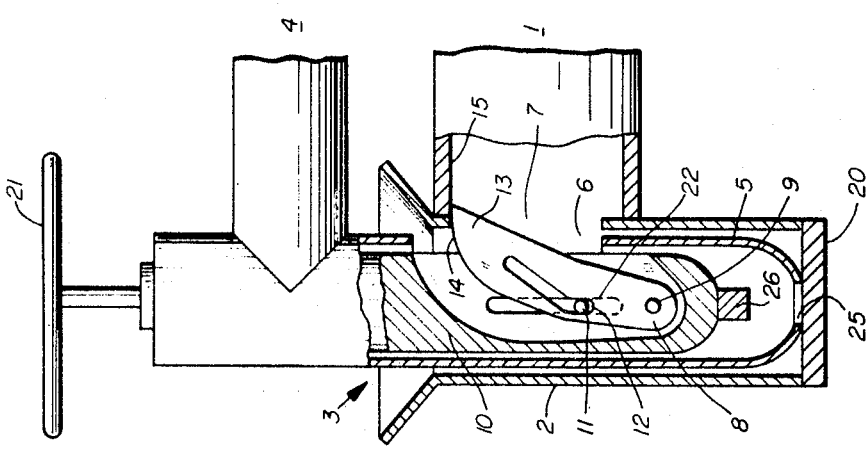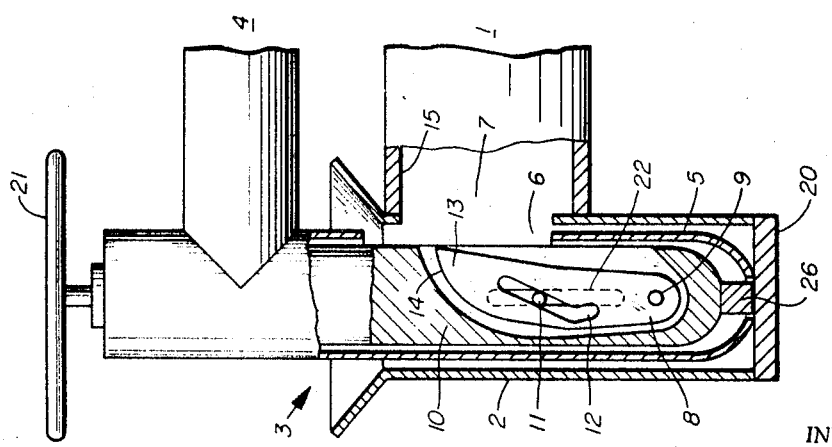

3,458,218
CONNECTOR
Bill S. Burrus, Tulsa, Okla., assignor to Combustion Engineering, Inc., New York, N.Y., a corporation of Delaware
Filed Oct. 11, 1967, Ser. No. 674,411
Int. Cl. F16l 55/00, 35/00, 37/00
U.S. Cl. 285—38      3 Claims

ABSTRACT OF THE DISCLOSURE

A coupling for connecting between a base platform and a module of equipment, including a socket mounted on the base platform receiving a leg of the module of equipment. Pivoted locking means are provided for locking the socket and leg against axial separation and means are provided for moving the socket and leg relative to each other to aid in axial separation.

BACKGROUND OF THE INVENTION

Field of the invention

The present invention relates to connections between two structural members.

Description of the prior art

Subsea drilling and well completion is a developing art. However, the processing of oil well production has largely been limited to surface equipment.

Plans are now being laid to mount equipment for initial processing near subsea wellheads. A level base is required for anchoring the equipment in place.

Basic support structure available at subsea wellheads must hold the base level. The base, or platform, for processing equipment must be more or less permanently mounted on the basic support structure through suitable connection means. However, if the well is abandoned, and the wellhead salvaged, it may be profitable to remove the basic support structure and attached base, or platform.

The process package, or module, is guided to, landed upon and connected to the base, or platform. The present invention solves the problem of readily connecting the process package to the level base, or platform, with a connection that operates positively and reliably within the hostile environment of the sea.

SUMMARY OF THE INVENTION

A principal object of the invention is to provide vertical actuation of a protuberance extended laterally from a leg of a process module into engagement with a base upon which the module is landed.

Another object is to provide means for breaking the outer surface of the leg from incrustations which tend to bind the leg to the base structure after the module has been locked to the base for a period of time.

The invention contemplates a leg member having an outer tubular shell in which an elongated inner member reciprocates. A dog member is pivoted from the inner member to protrude laterally outward from the leg under the control of a slot in the dog following a pin fixed to the outer shell as the outer shell and inner member reciprocate relative to each other. The dog protrudes into engagement with a base member to which it is desirable to lock the leg. An opening in the bottom of the outer shell provides for contact between the inner member and the base so the outer shell can be moved to lift the outer shell through linkage with the inner member, before the leg is withdrawn from the socket.

Other objects, advantages and features of this invention will become apparent to one skilled in the art upon consideration of the written specification, appended claims, and attached drawings, wherein;

BRIEF DESCRIPTION OF THE DRAWING

FIG. 1 is a sectioned elevation of a leg of a process module embodying the present invention as landed in a socket of a base, or platform, for support of the module;

FIG. 2 is the structure of FIG. 1 with the dog of the leg protruded into engagement with the base, or platform; and FIG. 3 is the structure with the outer shell pushed from the base socket as the initial action of disengagement of the leg.

DESCRIPTION OF THE PREFERRED EMBODIMENT

Basic arrangement of structure

Before taking up the arrangement of structure, and its function, in each of the views, it appears advisable to take a perspective view of the environment in which the present invention functions. First, review the fact that a conductor, or connector, pipe is the common evidence of a subsea well. Developments are now underway on production equipment to be attached to this pipe, near the wellhead. A spider, or support, structure is mounted on this pipe and provided sockets to receive the lower ends of legs of a base. The base is levelled when mounted in the support sockets. All of this structure is a more or less permanent installation, although it can be salvaged if the well is abandoned.

The present invention provides readily actuated connections to dog down the module of production equipment to the level base. In all of the drawings, base 1 is disclosed as having a tubular socket vertically arranged to receive leg 3 of process module 4.

Leg 3 has an outer tubular shell 5. This outer tubular shell 5 is sized to fit within socket 2 and move downwardly to bring side opening 6 into register with side opening 7 of the socket 2. Dog 8 is pivotally mounted at 9 on elongated member 10 which is telescoped within tubular outer shell 5. Pin 11, mounted on shell 5, and carried within slot 12 of dog 8, is the structure through which dog 8 is pivoted at 9 and moved to place its portion 13 laterally outward, through registered apertures 6 and 7, to bring surface 14 of the dog beneath locking surface 15 of base 1. When the dog is so positioned, leg 3 is thereby locked to base 1 until dog 8 is retracted.

FIG. 1.—Insertion of leg 3 into socket 2

Process module 4 has been guided to base 1 and leg 3 landed in socket 2. The lower end of socket 2 has been closed with end plate 20 and the ends of both outer shell 5 and elongated member 10 contact this plate 20. Handwheel 21 controls the threaded engagement of the upper portions of shell 5 and member 10. When leg 3 is inserted as disclosed in FIG. 1, both are placed in engagement with plate 20.

Handwheel 21 is next operated to crank member 10 upward while shell 5 remains bottomed on plate 20. Dog 8 is thereby pivoted to its locking position as disclosed in FIG. 2.

FIG. 2.—Lateral protrusion of dog 8

FIG. 2 discloses member 10 elevated by operation of handwheel 21. When member 10 is raised, pin 11 comes into action, causing dog 8 to move its upper portion 13 laterally through registered openings 6 and 7.

As member 10 moves upward it carries pivot pin 9 upward. However, pin 11 remains stationary, fixed to outer shell 5. Both pin 9 and pin 11 are horizontally extended.

Pin 9 is journalled in holes of member 10 and pin 11 is journalled in holes of outer shell 5.

Pin 11 also travels the length of vertical slot 22 in member 10; rather, slot 22 of member 10 provides passage for pin 11 as mmeber 10 reciprocates inside of outer shell 5. The dog extension and retraction results from the direction of groove 12 being angled from the vertical path of member 10. Slot 12 is at a predetermined angle to the vertical when dog 8 is held in the generally vertical position disclosed in FIG. 1. As the member 10 is raised, relative to shell 5, pin 11 is moved down vertical slot 22 and forces dog 8 into the protruding position of FIG. 2. Surface 14 of the dog is thereby moved beneath locking surface 15 of base 1. A more positive lock of dog 8 is provided by the lower portion of groove 12 having vertical alignment with slot 22. When pin 11 is in this portion of slot 12 there is a more positive locking of dog 8 into position.

FIG. 3.—Jack up and removal of leg 3

When it becomes desirable to remove leg 3 from socket 2, marine life and debric may be collected between outer shell 5 and socket 2. Some degree of bond may be developed. It will be desirable to apply a large, positively controlled, force to break this bond prior to applying an upward force on the process module.

An aperture 25 is provided in the lower end of outer shell 5. A protuberance 26 is provided on the end of member 10 and arranged in alignment with aperture 25 so that a finite movement upward is possible for shell 5 without lifting member 10 from its enegagement with plate 20.

Handwheel 21 can be operated to lift shell 5, jacking shell 5 out of socket 2 a distance which will break any bond between the socket and shell. The removal of leg 3 then becomes a simple matter of raising the module.

CONCLUSION

The number and arrangement of drawing figures has been carefully selected to disclose the pertinent static and dynamic relationships between the elements of the illustrated embodiment of the invention. The leg is basically comprised of two members which telescope together, controlled, through their threaded engagement, with handwheel 21. Elongated member 10, of this combination, is reciprocated up and down to protrude dog 8 into and out of engagement with locking surface 15. Additionally, after a period of engagement, the outer shell 5 of the leg can be jacked from the bottom of the socket 2 to start the disengagement of leg 3.

FIG. 1 discloses leg 3 after having a normal landing in socket 2. Both member 10 (through protuberance 26) and shell 5 are resting on the bottom plate 20 of socket 2. Dog 8 is retacted into its slot of member 10, but positioned opposite registered openings 6 and 7, ready to protrude through them and into engagement with surface 15.

FIG. 2 discloses handwheel 21 in its uppermost position, having been so operated manually. Of course, it is to be understood that other means could be employed to telescope member 10 within shell 5.

Shell 5 remains in contact with plate 20 while member 10 is raised. Fundamentally, slot 12 of dog 8 follows pin 11 which extends through the slot 12 and is fixed within holes in the wall of shell 5. Pin 11 forces dog portion 13 outward, through registered apertures 6 and 7, and comes to rest with its surface 14 in engagement with surface 15. The leg 3 is thereby locked in socket 2.

FIG. 3 discloses the first step of disengaging leg 3 from socket 2. Member 10 has been moved down until protuberance 26 is in contact with end plate 20. The relative movement of shell 5 upward and member 10 downward continues. Shell 5 is literally "jacked" upward, breaking any bond that may have developed between the outer surface of shell 5 and socket 2. So loosened, leg 3 will then be moved up readily, out of socket 2, the relative movements of shell 5 and member 10 having returned dog 8 to the unlocked, FIG. 1, position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. Many possible embodiments may be made of the invention without departing from the scope thereof.

The invention having been described, what is claimed is:

1. A connection between a base platform and a module of equipment, including,
   a socket mounted on a base platform, the socket being in the form of a tube with a side opening providing access to a locking surface of the platform,
   a leg attached to the module and adapted and arranged to extend down into the tubular socket and having,
   (a) an outer tubular shell sized to extend down into the socket tube to bring a side opening in register with the side opening of the socket tube,
   (b) an elongated member sized to telescope down into the outer tubular shell,
   (c) and a dog member pivoted on the elongated member at a position from which a portion of the dog can be moved laterally through the registered side openings into locking engagement with the platform surface which prevents withdrawal of the leg from the socket,
   and means to pivotally move said dog member into and out of locking engagement with said locking surface of said platform.

2. The connection of claim 1, wherein said means includes,
   an operator connected to the outer tubular shell and the elongated member to provide their relative telescoping movement,
   and a pin and groove engagement between the shell and member and dog arranged to cause the dog portion to protrude and retract into and out of engagement with the platform locking surface when said tubular shell and elongated member are moved relative to each other.

3. The connection of claim 1, including,
   a surface of the base platform arranged beneath an aperture of the outer tubular shell for engagement with the elongated member, said means providing for movement of said member into engagement with said surface when said dog is out of locking engagement with said locking surface whereby movement of the member through the aperture into engagement with the surface will jack the outer shell upward in the socket to break any incrustation accumulation that may tend to bond the leg to the socket.

References Cited

UNITED STATES PATENTS

| | | | |
|---|---|---|---|
| 1,910,706 | 5/1933 | Malzard | 285—38 X |
| 2,493,521 | 1/1950 | Benmingham | 285—308 X |
| 2,495,754 | 1/1950 | Nance | 285—308 X |
| 2,528,369 | 10/1950 | Jensen | 285—320 X |
| 3,152,830 | 10/1964 | Pounder et al. | 294—95 |
| 3,233,908 | 2/1966 | Schwarzmayr et al. | 294—95 X |

FOREIGN PATENTS 828,940   2/1960   Great Britain.

CARL W. TOMLIN, Primary Examiner

DAVE W. AROLA, Assistant Examiner

U.S. Cl. X.R.

285—308, 320, 399